(12) United States Patent
Baughman et al.

(10) Patent No.: US 11,080,180 B2
(45) Date of Patent: Aug. 3, 2021

(54) INTEGRATION TIMES IN A CONTINUOUS INTEGRATION ENVIRONMENT BASED ON STATISTICAL MODELING

(71) Applicant: INTERNATIONAL BUSINESS MACHINES CORPORATION, Armonk, NY (US)

(72) Inventors: Aaron K. Baughman, Cary, NC (US); Cameron Mcavoy, Raleigh, NC (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/694,276

(22) Filed: Nov. 25, 2019

(65) Prior Publication Data

US 2020/0089602 A1    Mar. 19, 2020

Related U.S. Application Data

(63) Continuation of application No. 15/481,944, filed on Apr. 7, 2017, now Pat. No. 10,635,577.

(51) Int. Cl.
*G06F 9/44* (2018.01)
*G06F 11/36* (2006.01)
(Continued)

(52) U.S. Cl.
CPC .......... *G06F 11/3692* (2013.01); *G06F 8/71* (2013.01); *G06F 8/77* (2013.01); *G06F 11/3664* (2013.01); *G06F 11/3672* (2013.01)

(58) Field of Classification Search
CPC .......... G06F 11/3692; G06F 8/71; G06F 8/77; G06F 11/3664; G06F 11/3672
(Continued)

(56) References Cited

U.S. PATENT DOCUMENTS 5,195,086 A * 3/1993 Baumgartner ...... H04L 12/1813
370/264
5,954,665 A    9/1999 Ben-Haim
(Continued)

FOREIGN PATENT DOCUMENTS

CN    101082876    12/2007

OTHER PUBLICATIONS

Title: The effectiveness of statistical analytical review as a substantive auditing procedure: A simulation analysis, author: WR Knechel, published on 1988.*
(Continued)

*Primary Examiner* — Chameli Das
(74) *Attorney, Agent, or Firm* — Anthony England; Andrew D. Wright; Roberts Calderon Safran & Cole, P.C.

(57) ABSTRACT

A computer-implemented method may include: receiving a request to integrate a commit; obtaining analytics data of an author that developed the commit; executing a simulation using the analytics data of the author as inputs to the simulation; obtaining results from the simulation, wherein the results indicate error rates when one or more testing stages are omitted from a testing procedure of the commit; comparing the results of the simulation with a threshold; determining, by the computing the device, the testing procedure based on the comparing, wherein the testing procedure identifies the one or more testing stages that are omitted and one or more testing stages that are included in the testing procedure; and outputting information regarding the determined testing procedure, wherein the outputting causes an integration server to test the commit in accordance with the testing procedure as part of an integration process for integrating the commit to a project.

20 Claims, 7 Drawing Sheets

(51) Int. Cl.
  *G06F 8/77* (2018.01)
  *G06F 8/71* (2018.01)
(58) Field of Classification Search
  USPC .......................................................... 717/135
  See application file for complete search history.

(56) References Cited

U.S. PATENT DOCUMENTS

| | | | |
|---|---|---|---|
| 6,587,960 B1* | 7/2003 | Barford | G06F 11/2257 714/6.13 |
| 6,810,372 B1 | 10/2004 | Unnikrishnan et al. | |
| 6,865,582 B2 | 3/2005 | Obradovic et al. | |
| 7,343,587 B2* | 3/2008 | Moulden, Jr. | G06F 11/3664 714/E11.207 |
| 7,963,925 B1 | 6/2011 | Schecter | |
| 9,244,818 B1 | 1/2016 | Paleja | |
| 9,588,876 B2 | 3/2017 | Swierc et al. | |
| 10,250,693 B2 | 4/2019 | Colrain et al. | |
| 10,289,407 B1* | 5/2019 | Turner | G06F 3/14 |
| 2003/0139907 A1 | 7/2003 | McCarthy | |
| 2005/0114838 A1 | 5/2005 | Stobie et al. | |
| 2005/0223281 A1 | 10/2005 | Maly et al. | |
| 2005/0278576 A1 | 12/2005 | Hekmatpour | |
| 2006/0206870 A1 | 9/2006 | Moulden, Jr. et al. | |
| 2006/0230306 A1* | 10/2006 | Richards | G06F 11/076 714/6.32 |
| 2007/0038977 A1 | 2/2007 | Savage | |
| 2007/0250816 A1* | 10/2007 | Rose | G06Q 10/06 717/124 |
| 2008/0288834 A1 | 11/2008 | Manovit et al. | |
| 2010/0070390 A1* | 3/2010 | Komejan | G06Q 10/087 705/29 |
| 2010/0298826 A1 | 11/2010 | Leo et al. | |
| 2011/0066454 A1* | 3/2011 | Rosauer | G06Q 10/067 705/4 |
| 2015/0026121 A1 | 1/2015 | Shani et al. | |
| 2015/0143335 A1* | 5/2015 | Jain | G06F 8/71 717/121 |
| 2015/0186251 A1 | 7/2015 | Friedler et al. | |
| 2015/0234730 A1 | 8/2015 | Puthuff et al. | |
| 2015/0277901 A1 | 10/2015 | Karle et al. | |
| 2015/0286558 A1* | 10/2015 | Bartlow | G06F 8/71 717/131 |
| 2015/0317337 A1* | 11/2015 | Edgar | G06F 19/328 707/751 |
| 2015/0325138 A1 | 11/2015 | Selinger | |
| 2017/0353988 A1* | 12/2017 | Lopes | H04W 48/20 |
| 2017/0364354 A1 | 12/2017 | Masis et al. | |
| 2018/0129497 A1* | 5/2018 | Biddle | G06F 11/3636 |
| 2018/0165609 A1* | 6/2018 | Monk | G06Q 10/00 |
| 2018/0191867 A1 | 7/2018 | Siebel et al. | |
| 2018/0276111 A1 | 9/2018 | Datta | |
| 2018/0293158 A1 | 10/2018 | Baughman et al. | |
| 2018/0321993 A1 | 11/2018 | McClory et al. | |
| 2019/0214820 A1* | 7/2019 | Frolik | H02J 3/14 |
| 2020/0111047 A1* | 4/2020 | Johnson | G16H 10/60 |
| 2020/0319912 A1* | 10/2020 | Vully | G06F 3/0647 |

OTHER PUBLICATIONS

Reappraisal of hypothesis testing for method validation: detection of systematic error by comparing the means of two methods or of two laboratories author: C Hartmann et al, published on 1995.*
Getting the focus and the group: enhancing analytical rigor in focus group research, author: PS Kidd et al, published on 2000.
21st century simulation: Exploiting high performance computing and data analysis, author: DM Davis, published on 2004.
Singh, "Statistical Methods for VLSI Test, Quality and Reliability", http://Iieeexplore.ieee.org/xpls/icp.jsp?arnumber=1299215, Tutorial 4, Auburn University, VLSI Test Symposium, May 18, 2004, 1 page.
Baglietti et al., Integration and Reliability Testing for Component-Based Software Systems, http://Iieeexplore.ieee.org/xpls/icp.jsp?arnumber=5349838, 35th Euromicro Conference on Software Engineering and Advanced Applications, 2009, 7 pages.
Jiong et al., "Deriving Software Statistical Testing Model from UML Model", http://ieeexplore.ieee.org/xpls/icp.jsp?arnumber=1319120, Proceedings of the Third International Conference on Quality Software, IEEE, 2003, 8 pages.
Zhu et al., "Sparse Linear Integration of Content and Context Modalities for Semantic Concept Retrieval", http://ieeexplore.ieee.org/xpls/icp.jsp?arnumber=6994780, IEEE Transactions on Emerging Topics in Computing, Jun. 10, 2015, 9 pages.
Piga et al., "Assessing Computer Performance with SToCS", http://dl.acm.org/citation.cfm?id=2479915&CFID=576268575&CFTOKEN=11256635, ICPE'13, Apr. 21-24, 2013, 4 pages.
Biswas et al., "Reducing Test Cost of Integrated, Heterogeneous Systems Using Pass-Fail Test Data Analysis", http://dl.acm.org/citation.cfm?id=2566666&CFID=576268575&CFTOKEN=11256635, ACM Trans. Des. Autom. Electron. Syst. 19, 2, Article 20, Mar. 2014, 23 pages.
Cheng et al., "Capturing Intrinsic Parameter Fluctuations using the PSP Compact Model", http://dl.acm.org/citation_cfm?id=1871080&CFID=576268575&CFTOKEN=11256635, EDAA, 2010, 4 pages.
Minelli et al., "I Know What You Did Last Summer an Investigation of How Developers Spend Their Time", http://dl.acm.org/citation_cfm?id=2820289&CFID=576268575&CFTOKEN=11256635, IEEE 23rd International Conference on Program Comprehension, 2015, 11 pages.
Anonymous, "Scaling Up: A Research Agenda for Software Engineering", http://dl.acm.org/citation.cfm?d=77482&CFID=576268575&CFTOKEN=11256635, Communications of the ACM, vol. 33, No. 3, Mar. 1990, 13 pages.
Jun et al., "Automated Routing Protocol Selection in Mobile Ad Hoc Networks", http:/Idl.acm.org/citation.cfm?d=1244202&CFID=576268575&CFTOKEN=11256635, SAC'07 Mar. 11-15, 2007, 8 pages.
Mell et al., "The NIST Definition of Cloud Computing", NIST, Special Publication 800-145, Sep. 2011, 7 pages.
List of IBM Patents or Patent Applications Treated as Related, dated Nov. 25, 2019, 1 page.
Notice of Allowance issued in U.S. Appl. No. 15/481,944 dated Jan. 3, 2020, 9 pages.
Deng et al., "Testing Database Transactions with Agenda", ICSE'05, pp. 78-87, May 15-21, 2005, 10 pages.

* cited by examiner

INTEGRATION TIMES IN A CONTINUOUS INTEGRATION ENVIRONMENT BASED ON STATISTICAL MODELING

BACKGROUND

The present invention generally relates to reducing integration times in a continuous integration environment and, more particularly, to reducing integration times by omitting excessive testing procedures.

Continuous integration (CI) is the practice, in software engineering, of merging all developer working copies to a shared mainline several times a day. CI may be performed as many as several times per day in certain systems. Continuous Delivery (CD) is a software engineering approach in which teams produce software in short cycles, ensuring that the software can be reliably released at any time. CI and CD aim to build, test, and release software faster and more frequently to reduce the cost, time, and risk of delivering changes by allowing for more incremental updates to applications in production. Various services are available that provide continuous integration for software deployments. Server-based systems may run in a servlet container and may support various known software deployment tools. CI is often implemented in cloud-based systems and remote application environments.

A continuous integration process may include building, testing, and reporting phases. In the testing phase, a commit undergoes a variety of different tests to ensure that the commit is compliant, performs as expected, and is free of defects that would adversely impact a project in which the commit is integrated.

SUMMARY

In an aspect of the invention, a computer-implemented method includes: receiving, by a computing device, a request to integrate a commit; obtaining, by the computing device, analytics data of an author that developed the commit; executing, by the computing device, a simulation using the analytics data of the author as inputs to the simulation; obtaining, by the computing device, results from the simulation, wherein the results indicate error rates when one or more testing stages are omitted from a testing procedure of the commit; comparing, by the computing device, the results of the simulation with a threshold; determining, by the computing the device, the testing procedure based on the comparing, wherein the testing procedure identifies the one or more testing stages that are omitted and one or more testing stages that are included in the testing procedure; and outputting, by the computing device, information regarding the determined testing procedure, wherein the outputting causes an integration server to test the commit in accordance with the testing procedure as part of an integration process for integrating the commit to a project.

In an aspect of the invention, there is a computer program product for reducing integration time of a commit. The computer program product includes a computer readable storage medium having program instructions embodied therewith, the program instructions executable by a computing device to cause the computing device to: receive a request to integrate a commit; determine analytics data of the commit; execute a simulation using the analytics data of the commit as inputs to the simulation; obtain results from the simulation, wherein the results indicate error rates when one or more testing stages are omitted from a testing procedure of the commit; compare the results of the simulation with a threshold; determine the testing procedure based on the comparing, wherein the testing procedure identifies the one or more testing stages that are omitted and one or more testing stages that are included in the testing procedure; and output information regarding the determined testing procedure, wherein the outputting causes an integration server to test the commit in accordance with the testing procedure as part of an integration process for integrating the commit to a project.

In an aspect of the invention, a system includes: a CPU, a computer readable memory and a computer readable storage medium associated with a computing device; program instructions to receive a request to integrate a commit; program instructions to determine analytics data of the commit; program instructions to obtain analytics data of an author that developed the commit; program instructions to execute a simulation using the analytics data of the commit and the analytics data of the author as inputs to the simulation; program instructions to obtain results from the simulation, wherein the results indicate error rates when one or more testing stages are omitted from a testing procedure of the commit; program instructions to compare the results of the simulation with a threshold; program instructions to determine the testing procedure based on the comparing, wherein the testing procedure identifies the one or more testing stages that are omitted and one or more testing stages that are included in the testing procedure; and program instructions to output information regarding the determined testing procedure, wherein the outputting causes an integration server to test the commit in accordance with the testing procedure as part of an integration process for integrating the commit to a project. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
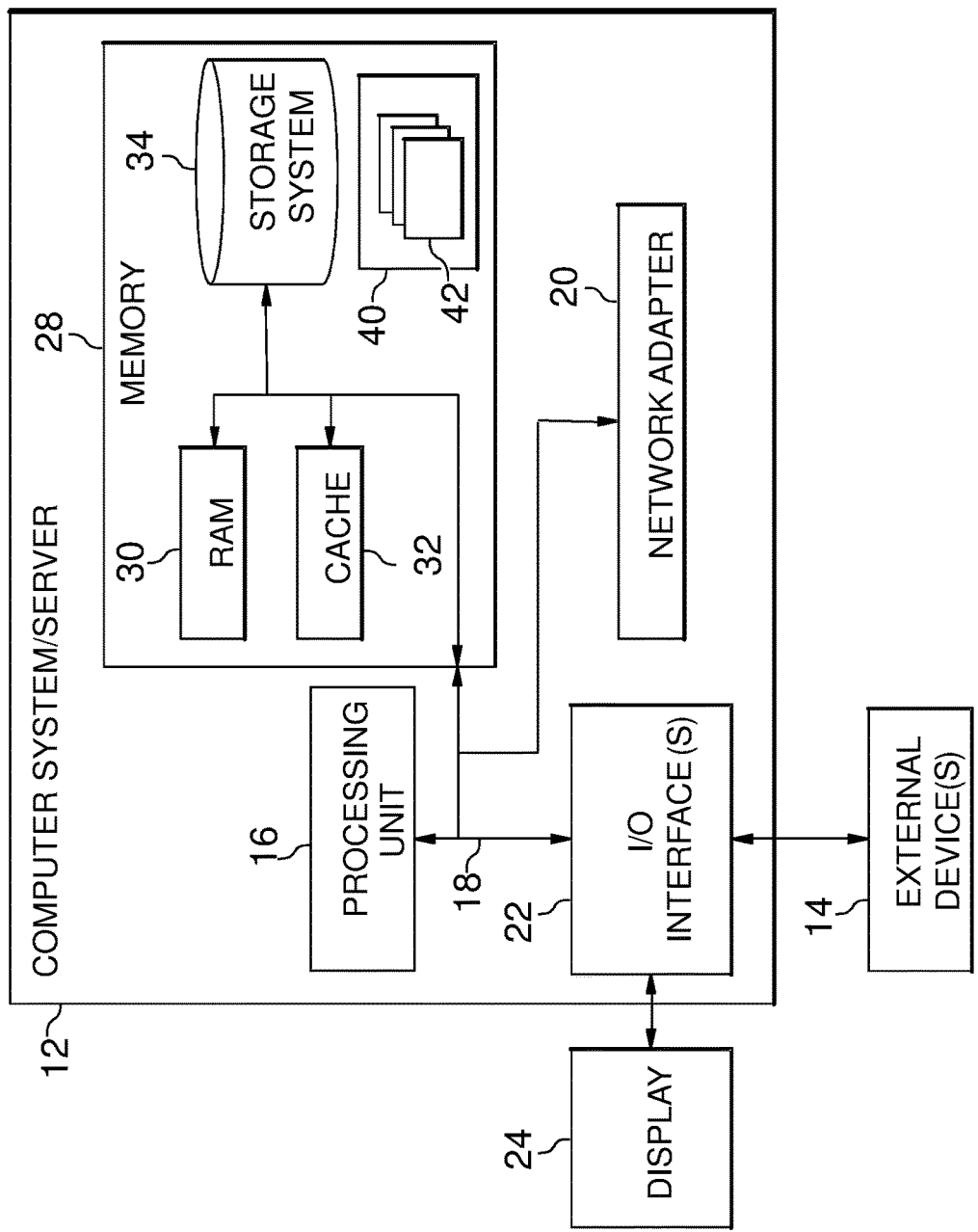
FIG. 1 depicts a cloud computing node according to an embodiment of the present invention.

The present invention generally relates to reducing integration times in a continuous integration environment and, more particularly, to reducing integration times by omitting excessive testing procedures. Integration testing of new commits and/or other software codes/packages for deployment is routinely performed to ensure that a new commit is compatible, safe, and properly functioning when deployed in a continuous integration software environment. Integration testing may include a series or stages of various different types of test that are performed on a commit prior to deployment. For example, integration testing may include dependency tests, static analysis, virtual machine end state comparison testing, upstream/downstream testing, etc. Integration testing may take a relatively long time to complete in a continuous integration environment. Accordingly, aspects of the present may reduce the number of tests and/or testing stages in the deployment/integration of a new commit while protecting the integrity and functionality of a project in which the commit is integrated.

As described herein, aspects of the present invention may implement statistical modeling, simulation, and/or other techniques to identify error rates and/or other measures of risk that indicate a risk associated with omitting particular testing stages in the integration of a new commit. When the risk measurement (e.g., a projected error rate of omitting a stage) satisfies a tolerance threshold, the testing stage may be omitted, thereby reducing the integration time. In this way, aspects of the present invention may reduce the amount of testing performed without significantly risking the integrity and functionality of a project, application, or code.

As described herein, aspects of the present invention may use analytics data as inputs to a statistical model to measure the risk of omitting testing stages. In embodiments, the analytics data may relate to programmer or author skill/ability, such as the historical rate of failure for a particular programmer, denial rate of merge requests for merging commits developed by the author into a project, percentage of commits that required rework, the level of rework needed per commit, etc. As such, aspects of the present invention may take programmer skill into consideration when determining whether to omit testing states and which testing stages may be omitted. In a situation in which insufficient analytics data is available for a particular programmer, no testing stages may be omitted, and analytics data regarding the programmer's abilities may be collected and stored over time to later determine testing stages that may be omitted for future commits produced by the programmer.

In embodiments, aspects of the present invention may also use analytics data for the commit itself as input to the statistical model/simulation. For example, aspects of the present invention may determine analytics data for the commit, such as the complexity of the commit, an estimate integration time for the commit, impact of a defective commit, etc. Aspects of the present invention may be more likely to omit testing stages for relatively lower complex commits, commits that take a relatively shorter amount of to integrate, and commits that have a relatively low impact if defective.

Aspects of the present invention may provide a technical solution to the technical problem of reducing integration times of commits in a build pipeline. In particular, aspects of the present invention may analyze error-related data associated with a particular user or author who produced a commit to determine a combination of testing stages that may be omitted without significantly adversely affecting a project in which the commit is integrated. Additionally, aspects of the present invention may provide a technical solution to the technical problem of reducing integration times of commits in a build pipeline by tracking and storing user error-related data for use in simulations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
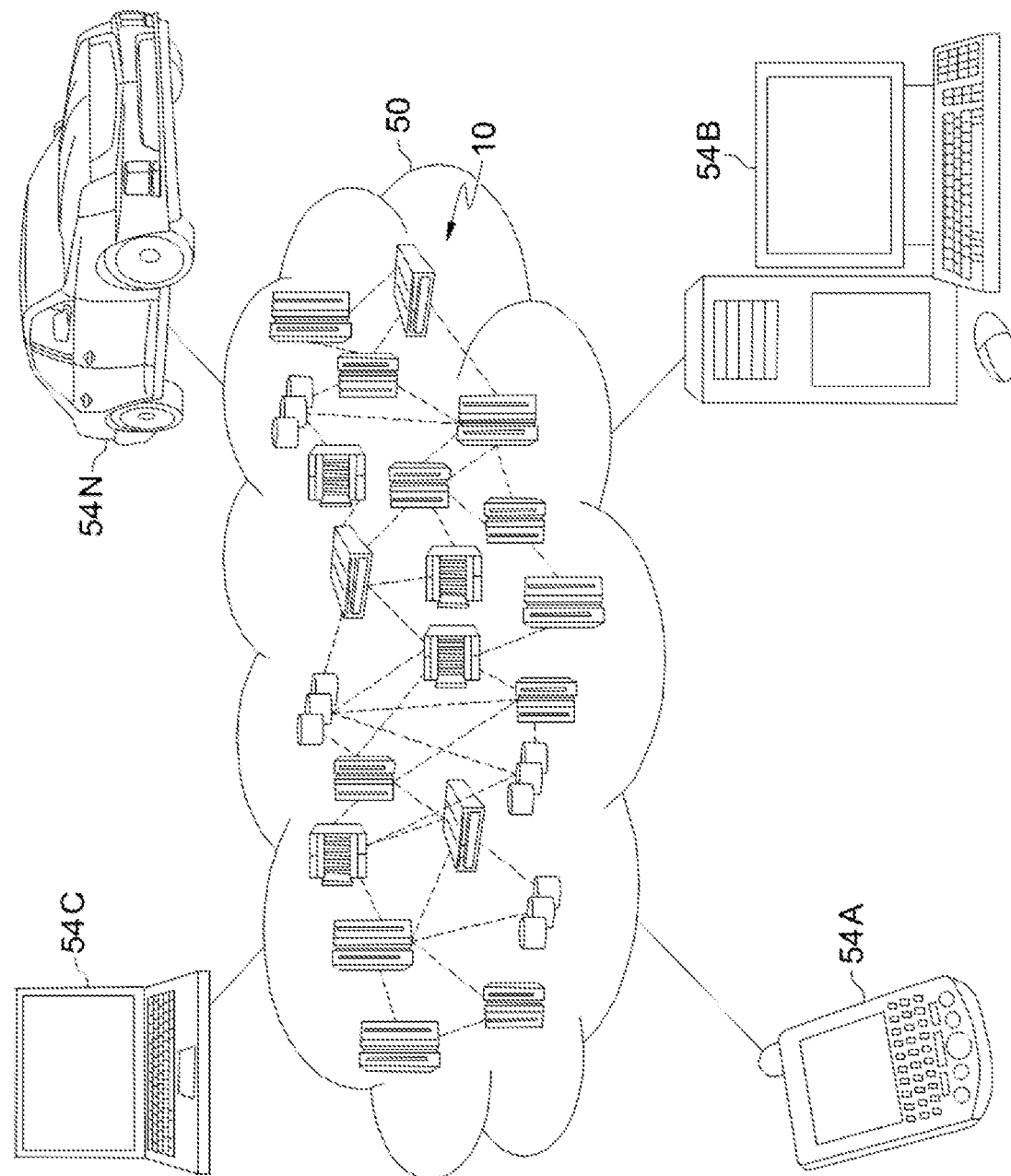
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
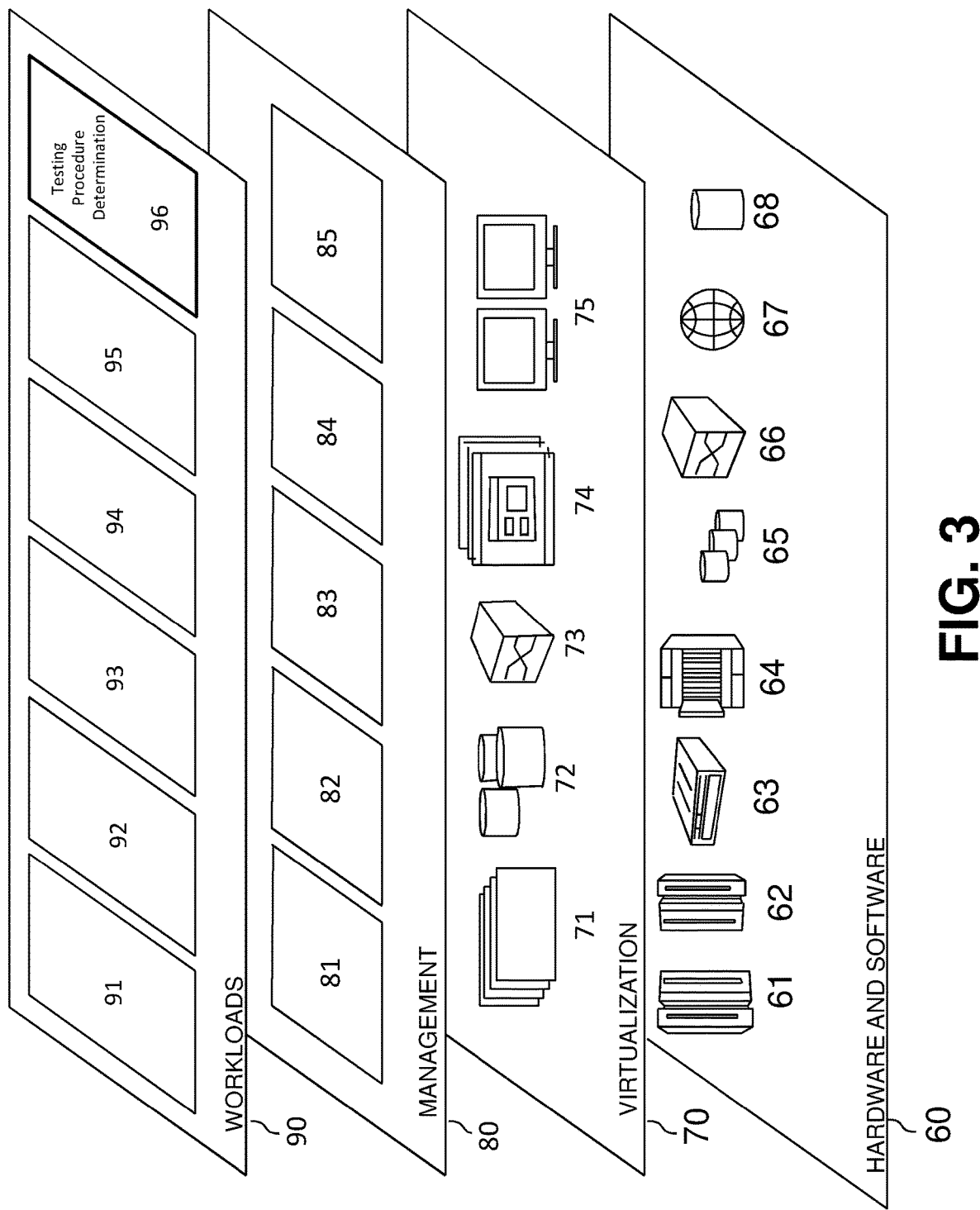
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and testing procedure determination 96.

Referring back to FIG. 1, the program/utility 40 may include one or more program modules 42 that generally carry out the functions and/or methodologies of embodiments of the invention as described herein (e.g., such as the functionality provided by testing procedure determination 96). Specifically, the program modules 42 may receive a commit request, obtain author analytics data, determine commit analytics data, execute a simulation and/or statistical model based on author and/or commit analytics data, compare error results from the simulation with tolerance thresholds, determine testing stages to perform based on the comparison, and output information regarding testing stages to perform. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a testing procedure determination server as shown in FIG. 4.

Figure 4:
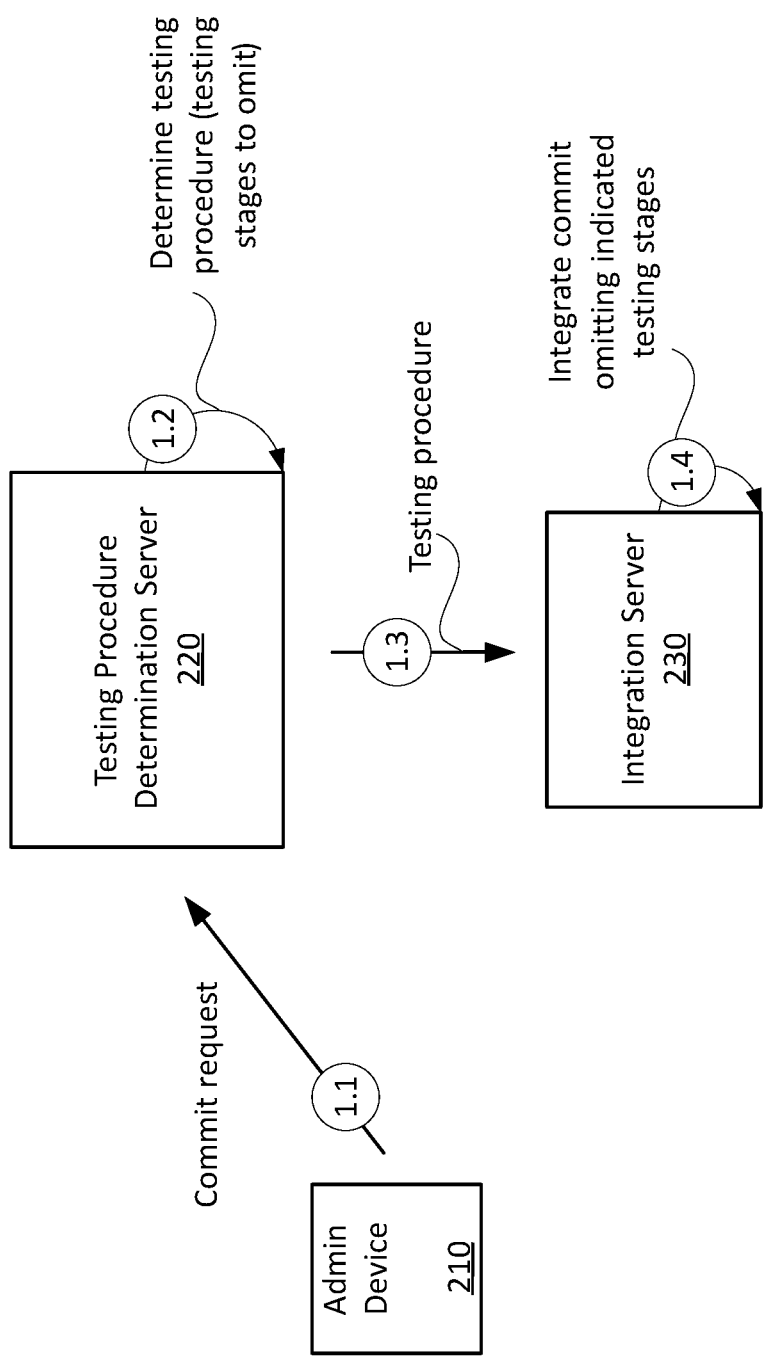
FIG. 4 shows an overview of an example implementation in accordance with aspects of the present invention

FIG. 4 shows an overview of an example implementation in accordance with aspects of the present invention. As shown in FIG. 4, an admin device 210 may provide a commit request to a testing procedure determination server 220 (at step 1.1). For example, a programmer or author may produce the commit request to update or modify a project. The commit request may identify the author and the updates to the project. At step 1.2, the testing procedure determination server 220 may determine a testing procedure for integrating the commit in a continuous integration environment. More specifically, the testing procedure determination server 220 may determine testing stages that may be omitted. For example, the testing procedure determination server 220 may determine the testing stages that may be omitted based on analytics data for the author (e.g., the historical rate of failure for commits produced by the author, denial rate of merge requests, percentage of commits that required rework, the level of rework needed per commit, etc.). Additionally, or alternatively, the testing procedure determination server 220 may determine testing stages that may be omitted based on attributes of the commit (e.g., the complexity of the commit, an estimate integration time for the commit, impact of if the commit was integrated and defective, etc.).

As described herein, the testing procedure determination server 220 may use the author analytics data and/or the commit analytics data as inputs into a simulation or statistical model. The outputs of the simulation may include a value or measure of risk indicating a risk level for omitting particular stages, or a particular combination of stages. For example, the outputs of the simulation may identify a level of risk (e.g., likelihood and impact of experiencing an error) when omitting testing stage A, omitting testing stage A and B, omitting testing stage B only, omitting testing stage A and C, omitting testing stage B and C, etc. The testing procedure determination server 220 may then compare the results of the simulation with a tolerance threshold (e.g., a configurable threshold that indicate the highest level of acceptable risk). The testing procedure determination server 220 may identify the combination of testing stages that may be omitted that save the most time while also being within the risk tolerance threshold.

At step 1.3, the testing procedure determination server 220 may output information indicating the testing procedure (e.g., the testing stages to perform and the testing stages that may be omitted). For example, the testing procedure determination server 220 may output information regarding the testing procedure to a integration server 230. At step 1.4, the integration server 230 may integrate the commit in accordance with the testing procedure. That is, when the testing portion of a pipeline integration procedure is initiated, the integration server 230 may perform the testing stages in accordance with the testing procedure (e.g., by omitting those procedures which, when omitted, increase the error rate by less than the tolerance threshold).

Figure 5:
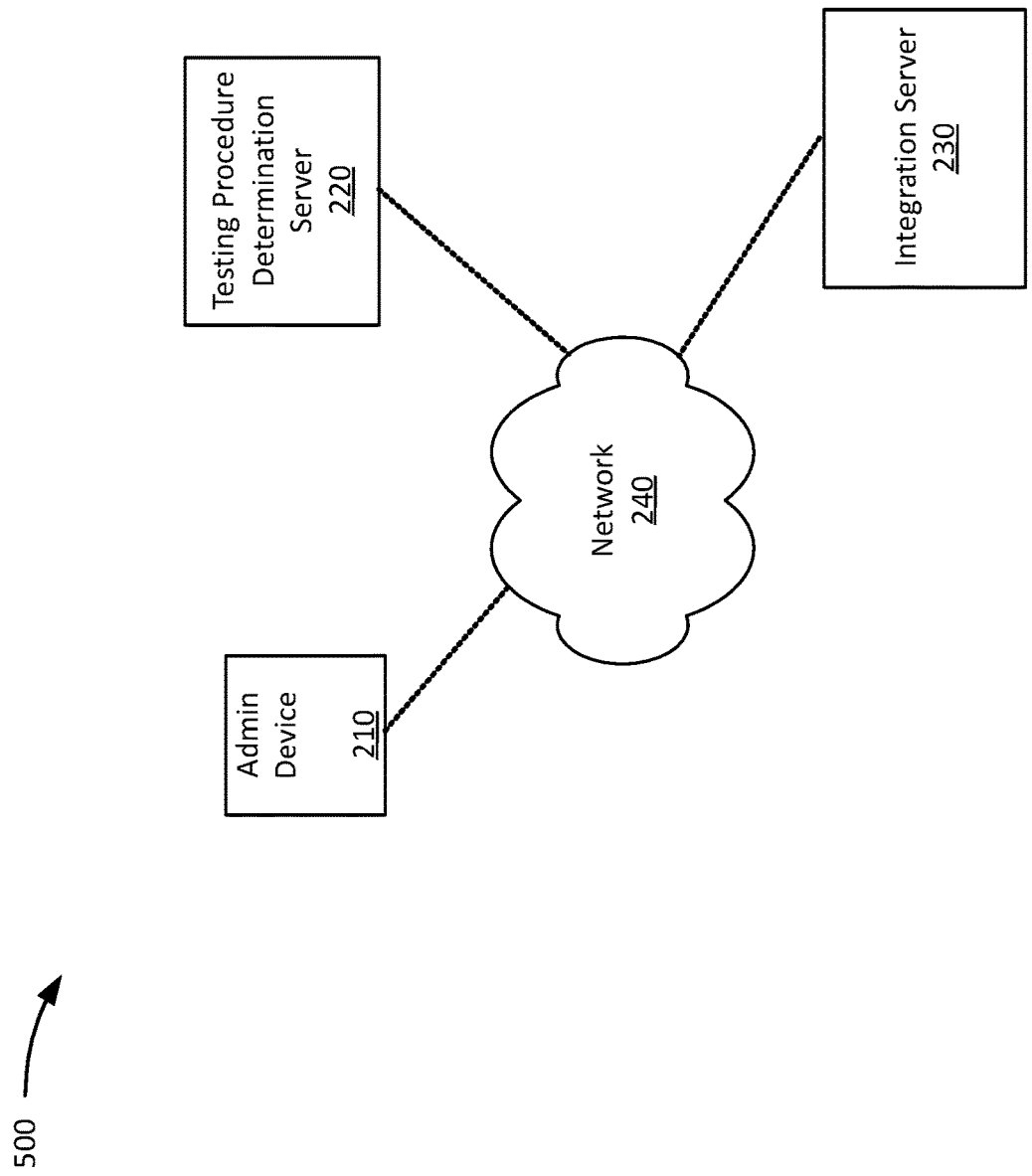
FIG. 5 shows an example environment in accordance with aspects of the present invention.

FIG. 5 shows an example environment in accordance with aspects of the present invention. As shown in FIG. 5, environment 500 may include an admin device 210, a testing procedure determination server 220, an integration server 230, and network 240. In embodiments, one or more components in environment 500 may correspond to one or more components in the cloud computing environment of FIG. 2. In embodiments, one or more components in environment 500 may include the components of computer system/server 12 of FIG. 1.

The admin device 210 may include a device capable of communicating via a network, such as the network 240. For example, the admin device 210 may correspond to a portable computer device (e.g., a laptop or a tablet computer), a desktop computer, a server, and/or another type of computing device. In some embodiments, the admin device 210 may be used by a programmer/author to develop or produce a commit request. The admin device 210 may provide the commit request to the testing procedure determination server 220 for integration into a project.

The testing procedure determination server 220 may include one or more computing devices (e.g., such as computer system/server 12 of FIG. 1) that receives a commit request from the admin device 210. The testing procedure determination server 220 may store analytics data for one or more authors that produce commits. For example, the testing procedure determination server 220 may store analytics data relating to the author's abilities, such as the historical rate of failure for a particular programmer, denial rate of merge requests, percentage of commits that required rework, the level of rework needed per commit, etc. The testing procedure determination server 220 may execute a simulation and/or create a statistic model that identifies a level of risk (e.g., an error rate) of integrating a commit when a combination of test stages is omitted. The testing procedure determination server 220 may provide information regarding a testing procedure (e.g., indicating which test stages to omit and which stages to perform) to the integration server 230.

The integration server 230 may include one or more computing devices (e.g., such as computer system/server 12 of FIG. 1) that integrates a commit. For example, the integration server 230 may integrate a commit in accordance with a continuous integration process including building, testing, and reporting phases. As part of the testing phase, the integration server 230 may test the commit based on the testing procedure received from the testing procedure determination server 220. More specifically, the integration server 230 may execute a series of tests or testing stages on the commit as defined in the testing procedure. As described herein, the testing procedure may omit one or more tests in order to reduce the testing time and hence, reduce the integration of the commit.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
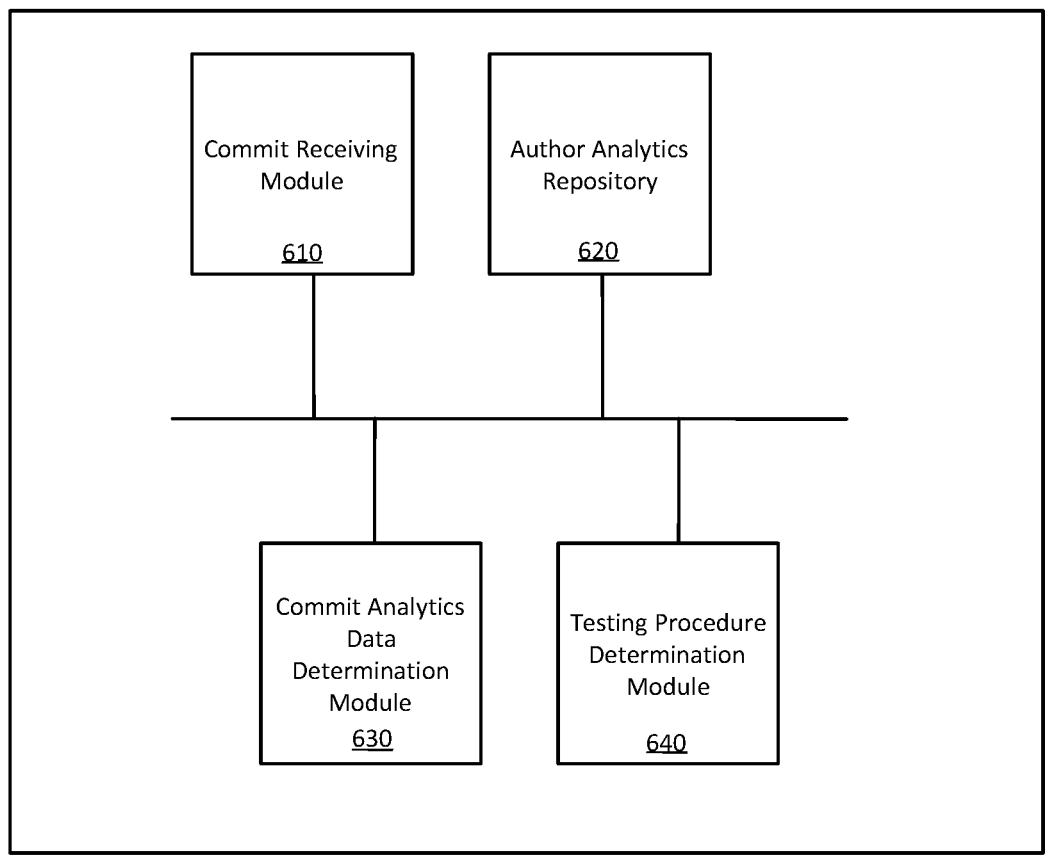
FIG. 6 shows a block diagram of example components of a testing procedure determination server in accordance with aspects of the present invention.

FIG. 6 shows a block diagram of example components of a testing procedure determination server in accordance with aspects of the present invention. As shown in FIG. 6, the testing procedure determination server 220 may include a commit receiving module 610, an author analytics repository 620, a commit analytics data determination module 630, and a testing procedure determination module 640. In embodiments, the testing procedure determination server 220 may include additional or fewer components than those shown in FIG. 6. In embodiments, separate components may be integrated into a single computing component or module. Additionally, or alternatively, a single component may be implemented as multiple computing components or modules.

The commit receiving module 610 may include a program module (e.g., program module 42 of FIG. 1) that receives commit requests from the admin device 210. In embodiments, the commit receiving module 610 may include a communications link, an application or web portal, and/or other system via which commits may be received.

The author analytics repository 620 may include a data storage device (e.g., storage system 34 of FIG. 1) that stores analytics data regarding one or more authors. For example, for each author, the author analytics repository 620 may store information relating to the author's abilities in developing a commit, such as the historical rate of failure for the author, denial rate of merge requests, percentage of commits that required rework, the level of rework needed per commit, etc. In embodiments, information stored by the author analytics repository 620 may be updated as new information is collected. For example, the author's failure rate may be updated each time a commit is tested and each time the commit passes or fails testing.

The commit analytics data determination module 630 may include a program module (e.g., program module 42 of FIG. 1) that determines commit analytics data for an incoming commit request. For example, the commit analytics data determination module 630 may determine commit analytics data, such as the complexity of the commit, an estimate integration time for the commit, an impact of a project in the event a defective commit is integrated, etc. In embodiments, the commit analytics data determination module 630 may determine the complexity of the commit based on historical data indicating the complexity of a similar commit. Additionally, or alternatively, the commit analytics data determination module 630 may determine the complexity of the commit based on the number of dependencies present in the commit. Additionally, or alternatively, the commit analytics data determination module 630 may determine the integration time based on the complexity, based on the types of changes identified in the commit, and/or based on the number of dependencies in the commit. Additionally, or alternatively, the commit analytics data determination module 630 may determine the impact to the project if the commit is integrated and is defective based on an importance of the project, dependencies of the commit/project, etc.

The testing procedure determination module 640 may include a program module (e.g., program module 42 of FIG. 1) that executes a simulation and/or implements a statistical model to determine a testing procedure for the commit (e.g., a procedure that identifies which testing stages should be performed and which testing stages may be omitted). In embodiments, the testing procedure determination module 640 may execute the simulation using the author analytics data and/or the commit analytics data as inputs. In embodiments, the simulation may determine a measure of risk or an error rate for each combination of testing stages that are omitted. For example, the outputs of the simulation may identify a level of risk (e.g., likelihood and impact of experiencing an error) when omitting testing stage A, omitting testing stage A and B, omitting testing stage B only, omitting testing stage A and C, omitting testing stage B and C, etc.

In embodiments, the testing procedure determination module 640 may use an object function may as part of the simulation to determine integration error rates when particular testing stages are included or omitted from the testing procedure. For example, the testing procedure determination module 640 may use the example object function:

$$f(\overline{x},\overline{xe}) = t(x_1|x_2, \ldots, x_n) + t(x_2|x_1, \ldots, x_n) + \ldots + t(x_n|x_1, \ldots, x_{n-1}) + \ldots + et(xe_n|\overline{x}) \quad (1)$$

where $\overline{x}$ is a vector of all components (e.g., testing stages) in a build pipeline, $\overline{xe}$ represents a probability of an error by a particular user, and t represents a build time. Values of $\overline{xe}$ to include may be determined using the example expression:

$$\forall x_j \in \overline{x} : P(xe_j | \text{user}, \overline{u}) \geq \text{threshold} \quad (2)$$

Each $\overline{xe}$ probability value for a user and for different components that are greater than a predefined threshold, may be included as inputs to equation 1. Those $\overline{xe}$ probability values that are not greater than the predefined thresholds may not be included, as the time incurred by the error because it is not likely to occur.

Equation 1 may represent the joint time of having a vector of all components that have been integrated into a pipeline with the most likely errors given the components. The output of equation 1 may represent the total time for a build. In embodiments, the testing procedure determination module 640 may minimize the time t.

In embodiments, the testing procedure determination module 640 may determine the probability that a particular error will happen if a user introduced the component using the example probability model:

$$P(xe_j | \text{user}, \overline{u}) \quad (3)$$

where $\overline{u}$ represents features about the user.

Additionally, or alternatively, the testing procedure determination module 640 may use a probability density function to determine a probably of an integration error when particular testing stages are included or omitted. In embodiments, any suitable probability density function may be used to model equation 3.

As described herein, the testing procedure determination module 640 may compare the results of the simulation with a tolerance threshold (e.g., a configurable threshold that indicate the highest level of acceptable risk). The testing procedure determination server 220 may identify the combination of testing stages that may be omitted that save the most time while also being within the risk tolerance threshold. The testing procedure determination module 640 may provide information regarding a testing procedure to the integration server 230 (e.g., a testing procedure that identifies which testing stages should be performed and which may be omitted). In embodiments, the testing procedure may identify that all tests should be performed in the event that insufficient author analytics data is available. Further, the results of tests performed may be stored by the author analytics repository 620. As data is collected over time for an author, the analytics data may be used in a simulation to determine the testing procedure for future commit requests received by the author.

Figure 7:
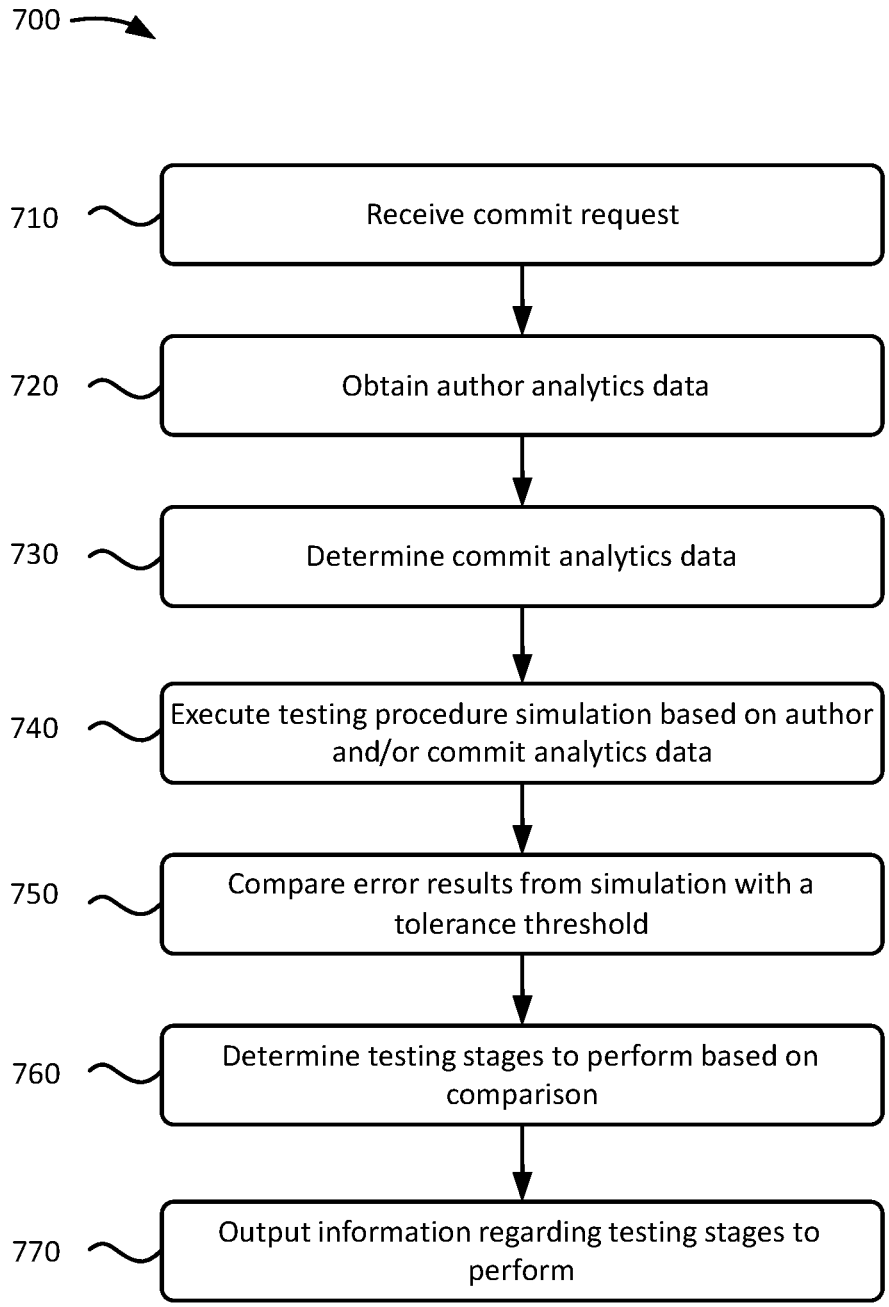
FIG. 7 shows an example flowchart of a process for executing a simulation and/or statistical model to determine testing stages that may be omitted when integrating a commit in accordance with aspects of the present invention.

FIG. 7 shows an example flowchart of a process for executing a simulation and/or statistical model to determine testing stages that may be omitted when integrating a commit in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include receiving a commit request (step 710). For example, as described above with respect to the commit receiving module 610, the testing procedure determination server 220 may receive the commit request (e.g., from the admin device 210 via an application or web portal, and/or other system via which commits may be received).

Process 700 may also include obtaining author analytics data (step 720). For example, the testing procedure determination server 220 may obtain the author analytics data from the author analytics repository 620. As described herein, the author analytics data may include information relating to the author's abilities in developing a commit, such as the historical rate of failure for the author, denial rate of merge requests, percentage of commits that required rework, the level of rework needed per commit, etc.

Process 700 may further include determining commit analytics data (step 730). For example, as described above with respect to the commit analytics data determination module 630, the testing procedure determination server 220 may determine commit analytics data, such as the complexity of the commit, an estimate integration time for the commit, an impact of a project in the event a defective commit is integrated, etc.

Process 700 may also include executing a testing procedure simulation based on author and/or commit analytics data (step 740). For example, as described above with respect to the testing procedure determination module 640, the testing procedure determination server 220 may execute a simulation and/or implements a statistical model to determine a testing procedure for the commit (e.g., a procedure that identifies which testing stages should be performed and which testing stages may be omitted). In embodiments, the testing procedure determination server 220 may execute the simulation using the author analytics data and/or the commit analytics data as inputs. In embodiments, the simulation may determine a measure of risk or an error rate for each combination of testing stages that are omitted. For example, the outputs of the simulation may identify a level of risk (e.g., likelihood and impact of experiencing an error) when omitting testing stage A, omitting testing stage A and B, omitting testing stage B only, omitting testing stage A and C, omitting testing stage B and C, etc. As described above, the testing procedure determination server 220 may use an object function and/or a probability density function to determine the level of risk when omitting testing stages.

Process 700 may further include comparing error results from the simulation with a tolerance threshold (step 750). For example, as described above with respect to the testing procedure determination module 640, the testing procedure determination server 220 may compare the results of the simulation with a tolerance threshold (e.g., a configurable threshold that indicate the highest level of acceptable risk).

Process 700 may also include determining testing stages to perform based on the comparison (step 760). For example, as described above with respect to the testing procedure determination server 220 may identify the combination of testing stages that may be performed and which stages may be omitted (e.g., those testing stages that, when omitted, save the most time while also being within the risk tolerance threshold).

Process 700 may further include (step 770). For example, as described above with respect to the testing procedure determination module 640, the testing procedure determination server 220 may provide information regarding a testing procedure to the integration server 230 (e.g., a testing procedure that identifies which testing stages should be performed and which may be omitted). In embodiments, the testing procedure may identify that all tests should be performed in the event that insufficient author analytics data is available. Further, the results of tests performed may be stored by the author analytics repository 620. As data is collected over time for an author, the analytics data may be used in a simulation to determine the testing procedure for future commit requests received by the author.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a computing device, analytics data of an author that developed a commit;
   executing, by the computing device, a simulation using the analytics data of the author as inputs to the simulation;
   obtaining, by the computing device, results from the simulation, wherein the results indicate error rates when one or more testing stages are omitted from a testing procedure of the commit;
   determining, by the computing the device, the testing procedure based on the results, wherein the testing procedure identifies the one or more testing stages that are omitted in the testing procedure; and
   outputting, by the computing device, information regarding the determined testing procedure,
   wherein the analytics data of the author comprises a denial rate of merge requests for merging commits developed by the author into a project.

2. The method of claim 1, further comprising determining analytics data associated with the commit, wherein the executing the simulation includes using the analytics data associated with the commit as inputs to the simulation.

3. The method of claim 2, wherein the analytics data associated with the commit is selected from a group consisting of:
   a complexity of the commit;
   an estimated integration time for the commit; and
   an impact of the project if the commit is defective.

4. The method of claim 1, wherein executing the simulation is based on an object function.

5. The method of claim 1, wherein executing the simulation is based on a probability density function.

6. The method of claim 1, wherein the method is implemented in a continuous integration environment.

7. The method of claim 1, wherein a service provider at least one of creates, maintains, deploys and supports the computing device.

8. The method of claim 1, wherein the obtaining the analytics data, the executing the simulation, the obtaining the results from the simulation, the determining the testing procedure, and the outputting the information regarding the determined testing procedure are provided by a service provider on a subscription, advertising, and/or fee basis.

9. The method of claim 1, further comprising deploying a system for reducing an integration time of the commit, comprising providing a computer infrastructure operable to perform the obtaining the analytics data, the executing the simulation, the obtaining the results from the simulation, the determining the testing procedure, and the outputting the information regarding the determined testing procedure.

10. The method of claim 1, further comprising comparing the results of the simulation with a level of acceptable risk.

11. The method of claim 10, wherein omission of the one or more testing stages that are omitted increases an error rate by less than the level of acceptable risk.

12. The method of claim 11, wherein the identifying the one or more testing stages that are omitted comprises identifying a combination of testing stages that, when omitted, results in a greatest time savings while increasing the error rate by less than the level of acceptable risk.

13. A computer program product for reducing integration time of a commit, the computer program product comprising a computer readable storage medium having program instructions embodied therewith, the program instructions executable by a computing device to cause the computing device to:
- determine analytics data of a commit;
- execute a simulation using the analytics data of the commit as inputs to the simulation;
- obtain results from the simulation, wherein the results indicate error rates when one or more testing stages are omitted from a testing procedure of the commit;
- determine the testing procedure based on the results, wherein the testing procedure identifies the one or more testing stages that are omitted in the testing procedure; and
- output information regarding the determined testing procedure, wherein:
- the program instructions further cause the computing device to obtain analytics data of an author that developed the commit, wherein the executing the simulation further includes using the analytics data of the author as inputs to the simulation,
- the analytics data of the author relates to author skill,
- the author skill is a factor in the identifying the one or more testing stages that are omitted in the testing procedure, and
- the analytics data of the author comprises a denial rate of merge requests for merging commits.

14. The computer program product of claim 13, wherein the computer program product is implemented in a continuous integration environment.

15. The computer program product of claim 13, wherein the analytics data associated with the commit is selected from a group consisting of:
- a complexity of the commit;
- an estimated integration time for the commit; and
- an impact of the project if the commit is defective.

16. The computer program product of claim 13, further comprising program instructions executable by the computing device to cause the computing device to determine the complexity of the commit based on:
- historical data indicating the complexity of a similar commit, and
- the number of dependencies present in the commit.

17. The computer program product of claim 13, further comprising program instructions executable by the computing device to cause the computing device to determine an estimated integration time based on:
- the complexity of the commit,
- the types of changes identified in the commit, and
- the number of dependencies in the commit.

18. A system comprising:
- a CPU, a computer readable memory and a computer readable storage medium associated with a computing device;
- program instructions to obtain analytics data regarding an author that developed a commit;
- program instructions to execute a simulation using the analytics data of the author as inputs to the simulation;
- program instructions to obtain results from the simulation, wherein the results indicate error rates when one or more testing stages are omitted from a testing procedure of the commit;
- program instructions to determine the testing procedure based on the results, wherein the testing procedure identifies the one or more testing stages that are omitted in the testing procedure; and
- program instructions to output information regarding the determined testing procedure,
- wherein the program instructions are stored on the computer readable storage medium for execution by the CPU via the computer readable memory, and
- wherein the analytics data regarding the author comprises a percentage of commits developed by the author that required rework.

19. The system of claim 18, further comprising program instructions to determine analytics data associated with the commit, wherein the executing the simulation includes using the analytics data associated with the commit as inputs to the simulation,
wherein the analytics data of the commit is selected from a group consisting of:
- a complexity of the commit;
- an estimated integration time for the commit; and
- an impact of the project if the commit is defective.

20. The system of claim 18,
wherein:
- the analytics data regarding the author further comprises a level of rework needed per commit developed by the author, and
- the level of rework is used to identify one or more testing stages that are omitted.

* * * * *